United States Patent [19]

Minten et al.

[11] Patent Number: 4,544,707

[45] Date of Patent: Oct. 1, 1985

[54] MANGANESE-TERTIARY PHOSPHINE-POLYMER COMPLEXES

[75] Inventors: Karl Minten, La Hoya, Calif.; William Krug, Hoffman Estates, Ill.

[73] Assignee: Gould Inc., Rolling Meadows, Ill.

[21] Appl. No.: 607,513

[22] Filed: May 7, 1984

[51] Int. Cl.$^4$ .............................................. C08F 8/42
[52] U.S. Cl. ............................. 525/330.4; 525/331.5; 525/331.6; 525/333.3; 525/340; 525/475
[58] Field of Search ................... 525/340, 475, 331.5, 525/331.6, 330.4, 333.3

[56] References Cited

U.S. PATENT DOCUMENTS

| | | | |
|---|---|---|---|
| 3,538,133 | 11/1970 | Knoth, Jr. .......................... | 260/429 |
| 4,027,084 | 5/1977 | Tkatchenko ....................... | 525/340 |
| 4,032,617 | 6/1977 | Gay ..................................... | 423/219 |
| 4,230,828 | 10/1980 | Gaul, Jr. et al. ................... | 525/340 |
| 4,251,452 | 2/1981 | McAuliffe et al. ................ | 260/429 R |
| 4,323,543 | 4/1982 | McAuliffe et al. ................ | 423/219 |
| 4,343,715 | 8/1982 | Bonaventura et al. ............ | 252/186 |

OTHER PUBLICATIONS

McAuliffe et al, "Working Haem Analogues; Reversible Oxygenation of the Manganese-Tertiary Phosphine Complexes MnLX$_2$" JCS Chemical Communications 1979, pp. 736–739.

Maier, "Organic Phosphorous Compounds", vol. 1, pp. 1–2, (Wiley & Sons, 1972).

*Primary Examiner*—Joseph L. Schofer
*Assistant Examiner*—Bernard Lipman

*Attorney, Agent, or Firm*—G. P. Edgell; Edward E. Sachs; Jeannette M. Walder

[57] ABSTRACT

The present invention relates to novel polymer compositions and the novel method of their synthesis. The novel polymer compositions are synthesized by forming a tetrahydrofuran solution of a polymer selected from the group consisting of polyvinylchloride, polystyrene, and silicone; adding an anhydrous manganese salt of the formula:

$$MnX_2$$

wherein X is a species capable of forming an anion, preferably a halogen or a thiocyanate, then adding to the solution of polymer and manganese salt, a phosphine of the formula:

$$PR^1R^2R^3$$

wherein $R^1$, $R^2$, and $R^3$ may be the same or different, and each is selected from the group consisting of substituted or unsubstituted alkyl, cycloalkyl or aryl groups or hydrogen, provided that no more than two of the groups $R^1$, $R^2$, and $R^3$ are substituted or unsubstituted aryl groups and that at least one of the groups $R^1$, $R^2$, and $R^3$ is a substituted or unsubstituted alkyl, cycloalkyl or aryl group. Films formed from the novel polymer composition have particular utility in reversibly complexing with gases such as oxygen, hydrogen, sulfur dioxide, alkenes, carbon monoxide and the like.

22 Claims, No Drawings

MANGANESE-TERTIARY PHOSPHINE-POLYMER COMPLEXES

BACKGROUND OF THE INVENTION

The present invention relates to novel polymer compositions useful in reversibly complexing with gases such as oxygen, hydrogen, sulfur dioxide, alkenes, carbon monoxide and the like. The present invention further comprehends a novel method by which the polymer compositions can be synthesized.

It is known that certain metal complexes take up gases to form adducts from which the gases can be recovered. The Cobalt (II) complex known as the Salen Chelate and related Fluomine chelate complexes of the Vaska type, in which the metal is iridium, ruthenium, osmium or rhodium, take up oxygen reversibly. Under moderate conditions the adducts do not however release oxygen to regenerate the sorbent complexes sufficiently readily to enable oxygen to be produced or nitrogen to be purified on a commercial scale.

It is also known that certain chemical complexes will reversibly complex with gases. In particular McAuliffe et al, in the U.S. Pat. No. 4,251,452 disclose and claim certain manganese-tertiary phosphine complexes useful in the separation of a gas such as oxygen, hydrogen, sulfur dioxide, alkenes and carbon monoxide from a fluid comprising the gas.

The compositions disclosed and claimed by McAuliffe et al. are of the formula:

$$MnLX_2$$

in which X is a species capable of existing as an anion and L represents a monodentate ligand of formula:

$$PR^1R^2R^3$$

wherein $R^1$, $R^2$, and $R^3$ may be the same or different and represent substituted or unsubstituted alkyl, cycloalkyl or aryl groups or hydrogen provided that no more than two of the groups $R^1$, $R^2$, and $R^3$ are substituted or unsubstituted aryl groups and that at least one of the groups $R^1$, $R^2$, and $R^3$ is a substituted or unsubstituted alkyl, cycloalkyl or aryl group. X is preferably —Cl, —Br, —I, —CN, —NO₂, —NO₃, —OH, —NCS or —NCO.

McAuliffe et al. speculate that their manganese complexes may in fact exist in dimeric or tetrameric form in which case:

$$MnLX_2$$

is the empirical formula.

McAuliffe et al. contemplate use of their compositions either in liquid solution, or carried on a particulate support. Each of these application techniques has substantial drawbacks, and in the particulate solid case the rate of gas absorption or desorption is relatively slow. Attempts to incorporate the compositions of McAuliffe et al. into polymers, or liquid polymer solutions, did not provide acceptable compositions for use in reversible complexing. When cast as a film the polymer composition would absorb gas, but would not reversibly release the gas.

For example a tri-n-butyl phosphine manganese (II) thiocyanate complex, a composition taught by McAuliffe, was incorporated into a 10% solution of polyvinylchloride in tetrahydrofuran. When a film was cast from the solution, the resulting film absorbed oxygen as evidenced by a change in color intensity, but did not release oxygen when the oxygen content of the ambient gaseous atmosphere was subsequently reduced.

SUMMARY OF INVENTION

We have now discovered that by adding a manganese salt to an anhydrous solution of a polymer selected from the group consisting of polyvinylchloride, silicone, polyvinylacetate, and polystyrene, in a suitable solvent, then adding a monodentate ligand to the polymer-manganese salt solution, we can produce polymer compositions which will reversibly complex with gases such as oxygen, hydrogen, sulfur dioxide, alkenes, carbon monoxide and the like. The manganese salt corresponds to the formula:

$$MnX_2$$

wherein X is a species capable of forming an anion; and the ligand is a compound of the formula:

$$PR^1R^2R^3$$

wherein $R^1$, $R^2$, and $R^3$ may be the same or different, and is selected from the group consisting of substituted or unsubstituted alkyl, cycloalkyl or aryl groups or hydrogen, provided that at least one of the groups $R^1$, $R^2$, and $R^3$ is a substituted or unsubstituted alkyl, cycloalkyl or aryl group.

While elevated temperatures may be required to dissolve the starting polymer in the solvent such as tetrahydrofuran the remainder of the synthesis can generally be carried out at room temperature, though preferably under anhydrous conditions. The polymer content of the starting polymer solution can vary widely and is primarily dependent on the amount of solvent needed to maintain suitable handling conditions such as any desired viscosity or the like. A 2% to 30% by weight solution is generally considered operable, and a 5% to 20% by weight solution is preferred.

The weight ratio of manganese salt to starting polymer is usually in the range of about 1:10 to 2:1 and preferably about 1:2 to 2:1. The ligand is added as at least a stoichiometric equivalent of the manganese salt, and preferably as a stoichiometric excess of 50% to 150%.

Ligands of particular interest include those within the following groups:

Phenyldialkylphosphines, diphenylalkylphosphines, cyclohexyldialkylphosphines, dicyclohexylalkylphosphines, trialkylphosphines, including methyldialkylphosphines, ethyldialkylphosphines, pentyldialkylphosphines, octyldialkylphosphines, and dodecyldialkylphosphines, dialkylphosphines. The following specific ligands are generally regarded as of interest, trimethylphosphine, triethylphosphine, tributylphosphine, methyldiethylphosphine, ethyldimethylphosphine, dimethylphenylphosphine, diethylphenylphosphine, methyldiphenylphosphine, diphenylethylphosphine, trioctylphosphine, in which the alkyl group is preferably a straight chain alkyl group.

A film can be cast from the solution of the polymer composition by any of a variety of widely known techniques well known to those skilled in the art. As taught by McAuliffe, by selecting a particular ligand it is possible to control the selection of the specific gas which will be complexed.

In the case of oxygen, the novel compositions have another useful property. Once the film is cast, as it absorbs oxygen the intensity of the color of the film will change getting darker or more intense as more oxygen is absorbed—or lighter as the process is reversed and oxygen is released. The particular color evidenced by a given film produced from a polymer composition containing a given ligand will vary according to the specific X moiety employed, and the nature of the $PR_3$ ligand present though to a lesser degree.

The change in color intensity as the concentration of oxygen changes, provides one example of the manner in which the novel polymer compositions can be employed. By casting a film inside a tube used to conduct oxygen to a hospital patient, it is possible to monitor oxygen supply using a photosensitive metering device which can be triggered by a change in oxygen concentration of the gas being delivered to the patient. If the concentration of oxygen were to drop below a predetermined critical limit, there would be a change in the color intensity of the film, in this case becoming lighter, which would permit transmission of a sufficient intensity of light to reach the photosensitive metering device, thereby triggering suitable alarms.

PREFERRED EMBODIMENT

The peferred polymer compositions of the present invention are prepared with ligands of the formula:

wherein $R^1$ and $R^2$ may be the same or different, and each is selected from the group consisting of alkyl and substituted alkyl moieties having 1 to 12, preferably 2 to 18 carbon atoms; and $R^3$ is selected from the group consisting of alkyl and substituted alkyl moieties having 1 to 12, preferably 2 to 18 carbon atoms and aromatic moieties having from 6 to 18 and preferably 6 to 10 carbon atoms.

The following specific example will show by way of illustration and not by way of limitation, the use of the novel method and apparatus of the present invention.

It has been noted that the synthesis procedures of the present invention are best carried out employing anhydrous starting materials. Example 1 describes the drying and handling techniques employed to secure and maintain the starting materials in an anhydrous state. Examples 2 and 3 describe preparations of manganese (II) heme-like polymeric films prepared in situ from PVC and silicone.

EXAMPLE 1

Anhydrous manganese halides (Mn $X_2$, X = Cl, Br, or I) can be prepared by heating the commercial hydrated salts in vacuo at 150°–300° C./1 mm Hg for 12 hours. The products are pale pink solids which are powdered and manipulated in a dry box (they rapidly absorb moisture from air). Manganese thiocyanate can be prepared from manganese sulphate and barium thiocyanate and recrystallized from alcohol. The thiocyanate can be dried as described above for manganese halides. Tetrahydrofuran dried by refluxing over sodium wire, and freshly distilled from sodium benzophenone ketyl under nitrogen.

Ligands prepared by the method described in L. Maier, *Organic Phosphorous Compounds*, Vol. 1, p. 1. (Wiley & Sons 1972) and by methods described in the reference therein. The ligands are purified by distillation in vacuo where liquid, or recrystallization where solid.

The air-sensitive nature of many of the ligands requires that they generally be handled under an inert atmosphere such as argon or nitrogen and by syringe techniques.

EXAMPLE 2

Preparation of $Mn(PR_3)(NCS)_2(THF)n$, n=1–3 polyvinylchloride film (PVC), R = n-butyl.

To 60 ml of tetrahydrofuran, freshly distilled from sodium benzophenone ketyl under nitrogen, was added 5 g of PVC. To the resulting 10% PVC solution was added 2.27 g (13.3 mmol) of $Mn(NCS)_2$. This was stirred under argon at room temperature for four hours to form a slurry of solvated complex. 6.6 ml (26.1 mmol) of tri-n-butyl phosphine was added to this complex.

After two hours of stirring the solution color changed from colorless transparent to yellow. Films formed from this solution exhibited maximum activity for oxygen after one day as determined by the relative change of red color intensity when exposed to varying $pO_2$ pressures.

As a general rule it was found that as the length of the alkyl chain, R, substituted on the phosphine ligand, L, increased longer stirring times were required to yield an oxygen active film. For example, to perpare the film where R = n-octyl the reaction time to yield an oxygen active film of maximum activity increases from 24 hours to 100 hours.

EXAMPLE 3

Preparation of $Mn(PR_3)(NCS)_2(THF)n$, n=1–3 in RTV silicone, R = n-butyl.

To a 10% solution of RTV silicone in toluene was added 2.5 g (14.6 mmol) of $Mn(SCN)_2$. To this was added 3.6 ml (44 mmol) of THF. The solution was stirred one hour to form the $Mn(NCS)(THF)n$ complex according to the prior art. 7.37 ml (29.2 mmol) of tri-n-butyl phosphine was added. The emulsion that forms exhibits slight oxygen activity after one day. The reaction is completed when the emulsion separates into an opaque white bottom layer and a transparent yellow upper layer.

The final active complex exhibits a greater $O_2$ affinity than the PVC film and less than the polystyrene film.

EXAMPLE 4

The procedure of Example 2 was repeated substituting polystyrene for the polyvinylchloride starting polymer of Example 2 and the solvent changed to toluene.

EXAMPLE 5

The procedure of Example 2 was repeated substituting tri-n-octyl phosphine for the tri-n-butyl phosphine of Example 2.

EXAMPLE 6

The Procedure of Example 2 was repeated substituting polyvinylacetate for the polyvinylchloride starting polymer of Example 2.

EXAMPLE 7

The procedure of Example 2 was repeated substituting tri-ethyl phosphine for the tri-n-butyl phosphine of Example 2.

EXAMPLE 8

The procedure of Example 2 was repeated substituting tri-phenylethyl phosphine for the tri-n-butyl phosphine of Example 2.

EXAMPLE 9

The procedure of Example 2 was repeated substituting manganese iodide and phenyldimethyl phosphine for the manganese thiocyanate and tri-n-butyl phosphine of Example 2.

EXAMPLE 10

The procedure of Example 9 was repeated substituting manganese bromide for the manganese iodide of Example 9.

In general the manganese thiocyanate—PVC—phosphine polymer compositions were found to provide the most "heme-like" films, and their moisture insensitivity seemed to increase with the chain lengths of trialkyl substituted phosphines. This is to say, polymer compositions, where the ligand was tri-n-octyl phosphine, showed better moisture insensitivity than those in which the ligand was tri-n-butyl phosphine, which in turn showed better moisture insensitivity than compositions prepared using triethyl phosphine. In addition polymeric compositions, wherein the starting polymer was silicone showed better moisture insensitivity than polymer compositions prepared using PVC or polystyrene. Polymeric compositions, wherein the starting polymer was polystyrene, tended to exhibit greater color intensity at low oxygen concentrations, which might make them particularly useful in application where it is necessary to be alerted to even relatively low concentrations of oxygen.

While we are not willing to limit ourselves to any one theory by which the novel method, compositions, or properties of our invention might be explained, it would appear likely that some type of crosslinking or complexing is taking place between two or more of the manganese salt, the phosphine, the tetrahydrofuran and/or the starting polymer. It would also appear that the significantly improved rates of absorption and desorption of gas exhibited by the films prepared from the novel polymer compositions of the present invention may be attributable to a significantly increased exposed surface area of gas complexing agent, as compared to the exposed surface area of prior art materials such as those employed by McAuliffe et al., as coating on a particulate support.

Alternatively, the ligand, polymer, manganese halide, and solvent complex may alter the activation barrier or energetics for gas absorption and desorption by the heme analogue.

The compositions of the present invention may be used in any form, shape, or configuration in which the starting polymer is conventionally employed, using any conventional casting technique. It has been noted that one of the most obvious use of the novel polymer compositions of the present invention, would be in the form of a film. It will be understood by those skilled in the art, that the specific conditions under which the film is to be cast, the techniques employed in laying down the film, and the environmental and other conditions under which the film will be employed, may require the use of other and additional materials such as heat, or light stabilizers, wetting agents and other similar additives well known to those skilled in the art. Suitable additives may be combined with the novel compositions of the present invention without substantially altering the advantages set forth hereinbefore.

It will of course also be obvious that other changes, modifications and alterations can be made in the compositions and methods herein described without departing from the scope of the invention herein disclosed and it is our intention to be limited only by the appended claims.

As our invention we claim:

1. A process of synthesizing polymer complex compositions, comprising the steps of: forming a substantially anhydrous first solution of a polymer selected from the group consisting of polyvinylchloride, polystyrene, polyvinylacetate, and silicone dissolved in a suitable solvent; adding a substantially anhydrous manganese salt of the formula:

$$MnX_2$$

wherein X is a species capable of forming an anion to form a second solution; then adding to said second solution at least a stoichiometric equivalent with respect to said manganese salt of a substantially anhydrous phosphine of the formula:

$$PR^1R^2R^3$$

wherein $R^1$, $R^2$, and $R^3$ may be the same or different, and each is selected from the group consisting of substituted or unsubstituted alkyl, cycloalkyl or aryl groups or hydrogen, provided that no more than two of the groups $R^1$, $R^2$, and $R^3$ are substituted or unsubstituted aryl groups and that at least one of the groups $R^1$, $R^2$, and $R^3$ is a substituted or unsubstituted alkyl, cycloalkyl or aryl group.

2. The process according to claim 1 wherein said solvent is tetrahydrofuran.

3. The process according to claim 1 wherein X is selected from the group consisting of chlorine, bromine, iodine and thiocyanate.

4. The process according to claim 1 wherein said phosphine is selected from the group consisting of phenyldialkylphosphines, diphenylalkylphosphines, cyclohexyldialkylphosphines, dicyclohexylalkylphosphines, trialkylphosphines, octyldialkylphosphines, and dodecyldialkylphosphines.

5. The process according to claim 4 wherein said phosphine is selected from the group consisting of trimethylphosphine, triethylphosphine, tributylphosphine, methyldiethylphosphine, ethyldimethylphosphine, dimethylphenylphosphine, diethylphenylphosphine, methyldiphenylphosphine, diphenylethylphosphine, and trioctylphosphine.

6. The process according to claim 1 wherein said polymer is polyvinylchloride.

7. The process according to claim 1 wherein said polymer is silicone.

8. The process according to claim 1 including the further step of casting a solid film from the solution of polymer complex composition.

9. The polymer composition produced by the process of claim 1.

10. The polymer composition produced according to the process of claim 2.

11. The polymer composition produced according to the process of claim 3.

12. The polymer composition produced according to the process of claim 4.

13. The polymer composition produced according to the process of claim 5.

14. The polymer composition produced according to the process of claim 6.

15. The polymer composition produced according to the process of claim 7.

16. The polymer composition produced according to the process of claim 8.

17. The process of claim 4 wherein said phosphine is selected from the group consisting of methyldialkylphosphines, ethyldialkylphosphines, and pentyldialkylphosphines.

18. The process of claim 1 wherein said polymer comprises between about 2 and 30 wt. %, inclusive, of said first solution, the weight ratio of said manganese salt to said polymer is in the range of about 1:10 to 2:1, inclusive, and said phosphine is added in a stoichiometric excess with respect to said manganese salt of between about 50 and 150%, inclusive.

19. The process of claim 18 wherein said polymer comprises between about 5 and 20 wt. %, inclusive, of said first solution and said weight ratio of said manganese salt to said polymer is between about 1:2 and 2:1, inclusive.

20. The polymer composition produced according to the process of claim 17.

21. The polymer composition produced according to the process of claim 18.

22. The polymer composition produced according to the process of claim 19.

* * * * *